Patented Apr. 29, 1941

2,240,352

UNITED STATES PATENT OFFICE 2,240,352

GLASS

Rudolf Schmidt, Weisswasser, Oberlausitz, and Walter Hänlein, Berlin-Spandau, Germany, assignors to General Electric Company, a corporation of New York No Drawing. Application February 8, 1938, Serial No. 189,452. In Germany February 18, 1937

3 Claims. (Cl. 106—36.1)

The present invention relates to the glass art generally and more particularly the invention relates to glass compositions useful as container glasses for gaseous electric discharge lamp devices the gaseous atmosphere of which consists of or comprises a chemically active metal vapor, such as sodium vapor.

Glasses of this type are now known in the art and one such glass is a boro-silicate glass containing about 10 to 25% of silica, an appreciable amount of boric anhydride, and other usual glass constituents, such as alkalies, alkaline earths and aluminium oxide. Such glasses are successfully used in sodium vapor discharge lamps in which the current input is such that the container temperature is about 240° C. When the current input is increased to raise the container temperature to about 300° C. the glass takes on a brownish tint which is undesirable. Attempts to solve this problem by increasing the boric anhydride content of the glass to above 60% and by reducing the silica content to about 4 to 9% have been made. While such glass compositions do not become brownish when used as a container glass for an alkali vapor lamp operating at such elevated container temperatures the manufacture of lamp containers comprising such a glass is expensive and complicated due to the fact that the glass is very hygroscopic. Small amounts of moisture, such as that introduced into the lamp container from the gas flame during the manufacture thereof are sufficient to start weathering of the glass which appears as a bluish-grey veil during the operation of a sodium vapor discharge device. The resistant glass rapidly becomes more absorbent of the light emitted by the vapor discharge and the lamp has a very short life.

The object of the present invention is to provide a glass composition which is resistant to hot, ionized, alkali metal vapor, such as sodium vapor, and which is non-hygroscopic. Another object of the invention is to provide a non-hygroscopic, alkali vapor resistant glass having a coefficient of expansion approximating that of the usual non-alkali vapor resistant glasses, such as the soda glasses, used generally in the lamp art as container glass. Still further objects and advantages attaching to the device and to its use and operation will be apparent to those skilled in the art from the following particular description.

We have discovered that a glass consisting of about 20 to 30% boric anhydride ($B_2O_3$), about 20 to 30% alumina ($Al_2O_3$), about 4 to 9% silica ($SiO_2$), about 30 to 40% alkaline earths and about 6 to 10% alkalies has the desirable alkali vapor resistant properties described above and is a non-hygroscopic glass.

Preferably the glass of the present invention is used as the inner layer of a two layer glass container the outer layer of which consists of a soda glass having a coefficient of expansion of about 80 to $90 \times 10^{-7}$ used extensively at present as a container glass for electric lamp devices and which is subject to attack by hot, ionized alkali metal vapor. This glass has the following composition in percentages by weight:

| | Per cent |
| --- | --- |
| Silica ($SiO_2$) | 69.5 |
| Alumina ($Al_2O_3$) | 2.0 |
| Potassium oxide ($K_2O$) | 1.0 |
| Sodium oxide ($Na_2O$) | 16.5 |
| Calcium oxide ($CaO$) | 5.5 |
| Magnesium oxide ($MgO$) | 3.5 |
| Barium oxide ($BaO$) | 2.0 |

When a glass having the above composition is used as the outer layer of the container the inner layer preferably consists of an alkali vapor resistant, non-hygroscopic glass having the following composition in percentages by weight:

| | Per cent |
| --- | --- |
| Silica ($SiO_2$) | 5.0 |
| Boric oxide ($B_2O_3$) | 25.0 |
| Alumina ($Al_2O_3$) | 25.0 |
| Barium oxide ($BaO$) | 36.5 |
| Sodium oxide ($Na_2O$) | 6.0 |
| Potassium oxide ($K_2O$) | 2.5 |

Since both of the above glasses are soft glasses the current leads and the machines and methods used in the fabrication of incandescent lamps can be used in the manufacture of alkali vapor discharge lamp devices.

A lamp container having the above structure is useful for vapor discharge lamps generally and particularly for such lamps operating at elevated container temperatures similar to those described in co-pending application Serial Number 127,500, filed February 24, 1937, now U. S. Patent 2,161,824.

What we claim as new and desire to secure by Letters Patent of the United States, is:

1. A glass resistant to hot, ionized alkali metal vapor when at a temperature of 300° C., said glass being capable of fusion with a non-alkali vapor resistant, soft soda glass having a coefficient of expansion of about 80 to $90 \times 10^{-7}$ to form a two layer glass container for an alkali vapor discharge lamp, said resistant glass consisting of about 20 to 30% boric anhydride ($B_2O_3$), about 20 to 30% alumina ($Al_2O_3$), about 4 to 9% silica ($SiO_2$), about 30 to 40% alkaline earths and about 6 to 10% alkalies.

2. A glass having the following composition:

|  | Per cent |
|---|---|
| Silica ($SiO_2$) | 5.0 |
| Boric oxide ($B_2O_3$) | 25.0 |
| Alumina ($Al_2O_3$) | 25.0 |
| Barium oxide (BaO) | 36.5 |
| Sodium oxide ($Na_2O$) | 6.0 |
| Potassium oxide ($K_2O$) | 2.5 |

3. A glass resistant to hot, ionized alkali metal vapor when at a temperature of 300° C., said glass being capable of fusion with a non-alkali vapor resistant, soft soda glass having a coefficient of expansion of about 80 to $90 \times 10^{-7}$ to form a two layer glass container for an alkali vapor discharge lamp, said soda glass having the following composition:

|  | Per cent |
|---|---|
| Silica ($SiO_2$) | 69.5 |
| Alumina ($Al_2O_3$) | 2.0 |
| Potassium oxide ($K_2O$) | 1.0 |
| Sodium oxide ($Na_2O$) | 16.5 |
| Calcium oxide (CaO) | 5.5 |
| Magnesium oxide (MgO) | 3.5 |
| Barium oxide (BaO) | 2.0 | said resistant glass consisting of about 20 to 30% boric anhydride ($B_2O_3$), about 20 to 30% alumina ($Al_2O_3$), about 4 to 9% silica ($SiO_2$), about 30 to 40% alkaline earths and about 6 to 10% alkalies.

RUDOLF SCHMIDT.
WALTER HÄNLEIN.